United States Patent
Ren et al.

(10) Patent No.: US 8,379,413 B2
(45) Date of Patent: Feb. 19, 2013

(54) CIRCUITS AND METHODS FOR CONTROLLING POWER CONVERTERS INCLUDING TRANSFORMERS

(75) Inventors: Zhimou Ren, Chengdu (CN); Jun Ren, Chengdu (CN); Yunning Xie, Chengdu (CN)

(73) Assignee: O2Micro Inc., Santa Clara, CA (US)

( * ) Notice: Subject to any disclaimer, the term of this patent is extended or adjusted under 35 U.S.C. 154(b) by 178 days.

(21) Appl. No.: 12/712,407

(22) Filed: Feb. 25, 2010

(65) Prior Publication Data

US 2011/0157923 A1     Jun. 30, 2011

(30) Foreign Application Priority Data

Dec. 25, 2009  (CN) .................. 2009 1 0265547

(51) Int. Cl.
  *H02M 3/335*     (2006.01)
(52) U.S. Cl. .................. 363/21.12; 363/21.04
(58) Field of Classification Search ............. 363/16–20, 363/21.04, 21.07, 21.12, 12.18, 41, 56.01, 363/97, 98, 127, 132; 323/235, 222, 282–288, 323/267, 272; 315/224, 291, 307
See application file for complete search history.

(56) References Cited

U.S. PATENT DOCUMENTS

| | | | |
|---|---|---|---|
| 4,724,363 A | 2/1988 | Buer | |
| 5,661,642 A * | 8/1997 | Shimashita | ................ 363/21.15 |
| 5,909,363 A | 6/1999 | Yoon | |
| 5,991,170 A | 11/1999 | Nagai et al. | |
| 6,111,762 A * | 8/2000 | Igarashi et al. | ............ 363/21.16 |
| 6,208,533 B1 | 3/2001 | Ogawa | |
| 6,396,718 B1 * | 5/2002 | Ng et al. | ..................... 363/21.07 |
| 6,515,876 B2 | 2/2003 | Koike et al. | |
| 7,145,786 B2 * | 12/2006 | Vinciarelli | ...................... 363/17 |
| 7,310,244 B2 | 12/2007 | Yang et al. | |
| 7,394,209 B2 * | 7/2008 | Lin et al. | ....................... 315/247 |
| 7,433,210 B2 * | 10/2008 | Meitzner et al. | ........... 363/21.12 |
| 7,697,308 B2 | 4/2010 | Huynh et al. | |
| 8,045,344 B2 * | 10/2011 | Grant | .............................. 363/28 |
| 2010/0172158 A1 | 7/2010 | Sato et al. | |

FOREIGN PATENT DOCUMENTS

| | | |
|---|---|---|
| JP | 2008-312335 A | 12/2008 |
| WO | 2008-054083 A1 | 5/2008 |

* cited by examiner

*Primary Examiner* — Rajnikant Patel

(57) ABSTRACT

A power converter includes a transformer operated in multiple switching cycles. At least one switching cycle includes a charging period, a discharging period, and an adjusting period. The transformer has a primary winding coupled to a power source and a secondary winding coupled to a load. During the charging period the transformer is powered by the power source and a current flowing through the primary winding increases. During the discharging period the transformer discharges to power the load and a current flowing through the secondary winding decreases. A ratio of a duration of the discharging period to a total duration of the charging period, the discharging period and the adjusting period is constant.

19 Claims, 5 Drawing Sheets

US 8,379,413 B2

CIRCUITS AND METHODS FOR CONTROLLING POWER CONVERTERS INCLUDING TRANSFORMERS

RELATED APPLICATION

This application claims foreign priority to Chinese Patent Application No. 200910265547.3, titled Circuits and Methods for Controlling Power Converters Including Transformers, filed on Dec. 25, 2009 with the Chinese Patent and Trademark Office.

BACKGROUND

A flyback converter is a switch mode power supply circuit that can be used in applications such as AC-to-DC adapters and battery chargers. FIG. 1 shows a block diagram of a conventional flyback converter 100. The flyback converter 100 utilizes a controller 120 to control a transformer. The transformer includes a primary winding 104 coupled to a DC source $V_{BB}$, a secondary winding 106 coupled to a load 112, and an auxiliary winding 108. The controller 120 controls a switch 118 coupled in series with the primary winding 104. When the switch 118 is turned on, a current flows through the primary winding 104 and energy is stored in a magnetic core 124 of the transformer. When the switch 118 is turned off, a diode 110 coupled to the secondary winding 106 is forward biased, and thus the energy stored in the magnetic core 124 is released through the secondary winding 106 to a capacitor 122 and the load 112. An error amplifier 114 compares the current flowing through a current sense resistor 111 with a reference current to generate a feedback signal FB. The feedback signal FB is transferred to the controller 120 through an optical coupler 116. The controller 120 controls the switch 118 based on the feedback signal FB to adjust the output power of the transformer. One of the drawbacks of this conventional flyback converter 100 is that the size of the flyback converter 100 is relatively large.

SUMMARY

A power converter includes a transformer operated in multiple switching cycles. At least one switching cycle includes a charging period, a discharging period, and an adjusting period. The transformer has a primary winding coupled to a power source and a secondary winding coupled to a load. During the charging period the transformer is powered by the power source and a current flowing through the primary winding increases. During the discharging period the transformer discharges to power the load and a current flowing through the secondary winding decreases. A ratio of a duration of the discharging period to a total duration of the charging period, the discharging period and the adjusting period is constant.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
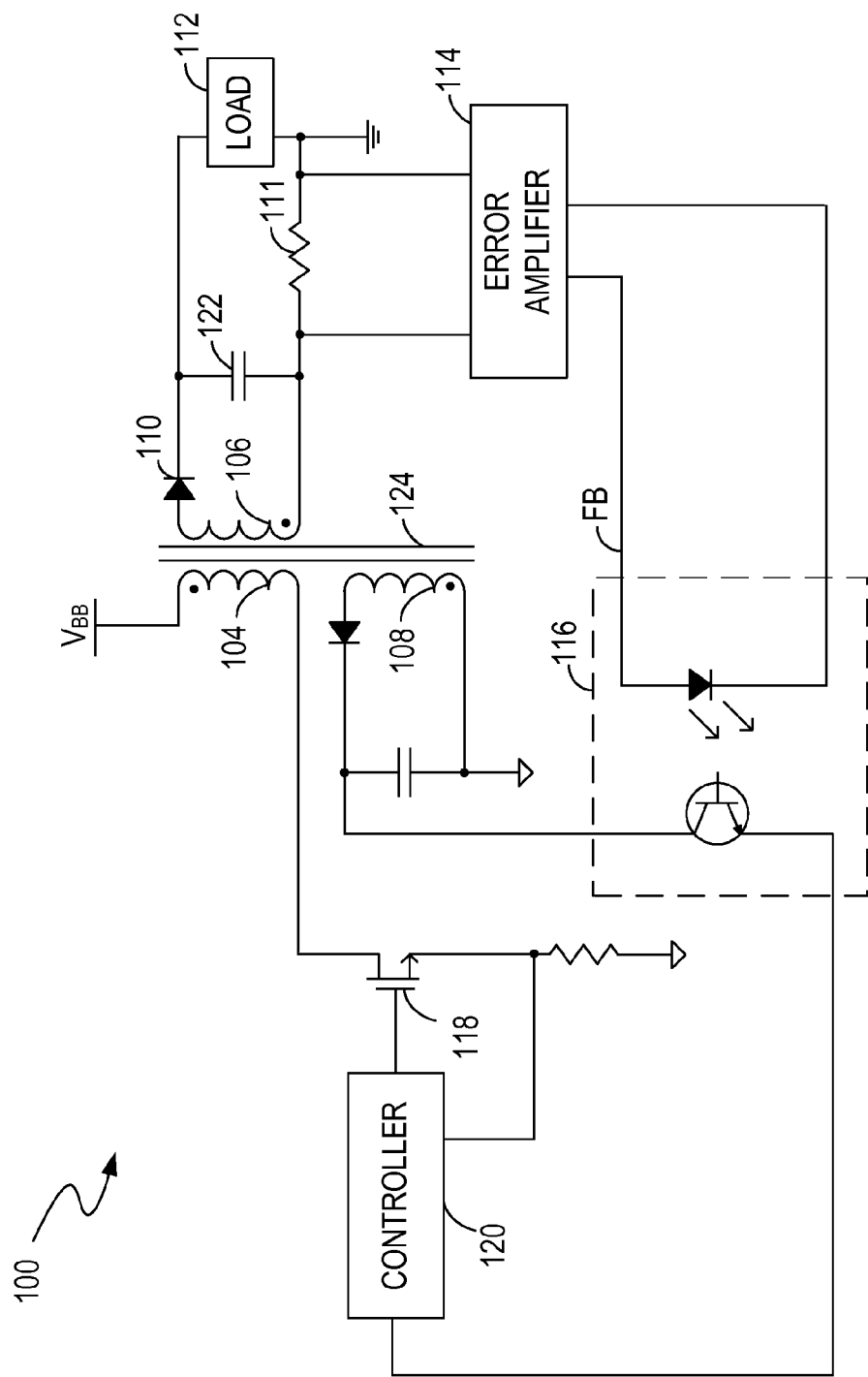
FIG. 1 shows a block diagram of a conventional flyback converter.

Embodiments in accordance with the present invention provide circuits and methods for controlling power converters that can be used to power various types of loads. The power converter can include a transformer and a controller for controlling the transformer. The controller can control a switch coupled in series with a primary winding of the transformer. Advantageously, the on/off time of the switch can be controlled in a way such that the transformer can provide a substantially constant current at its secondary winding. The output power of the power converter can be controlled without requiring some circuit components such as an optical coupler and an error amplifier shown in the conventional power converter in FIG. 1. Thus, the size and efficiency of the power converter can be improved.

Figure 2:
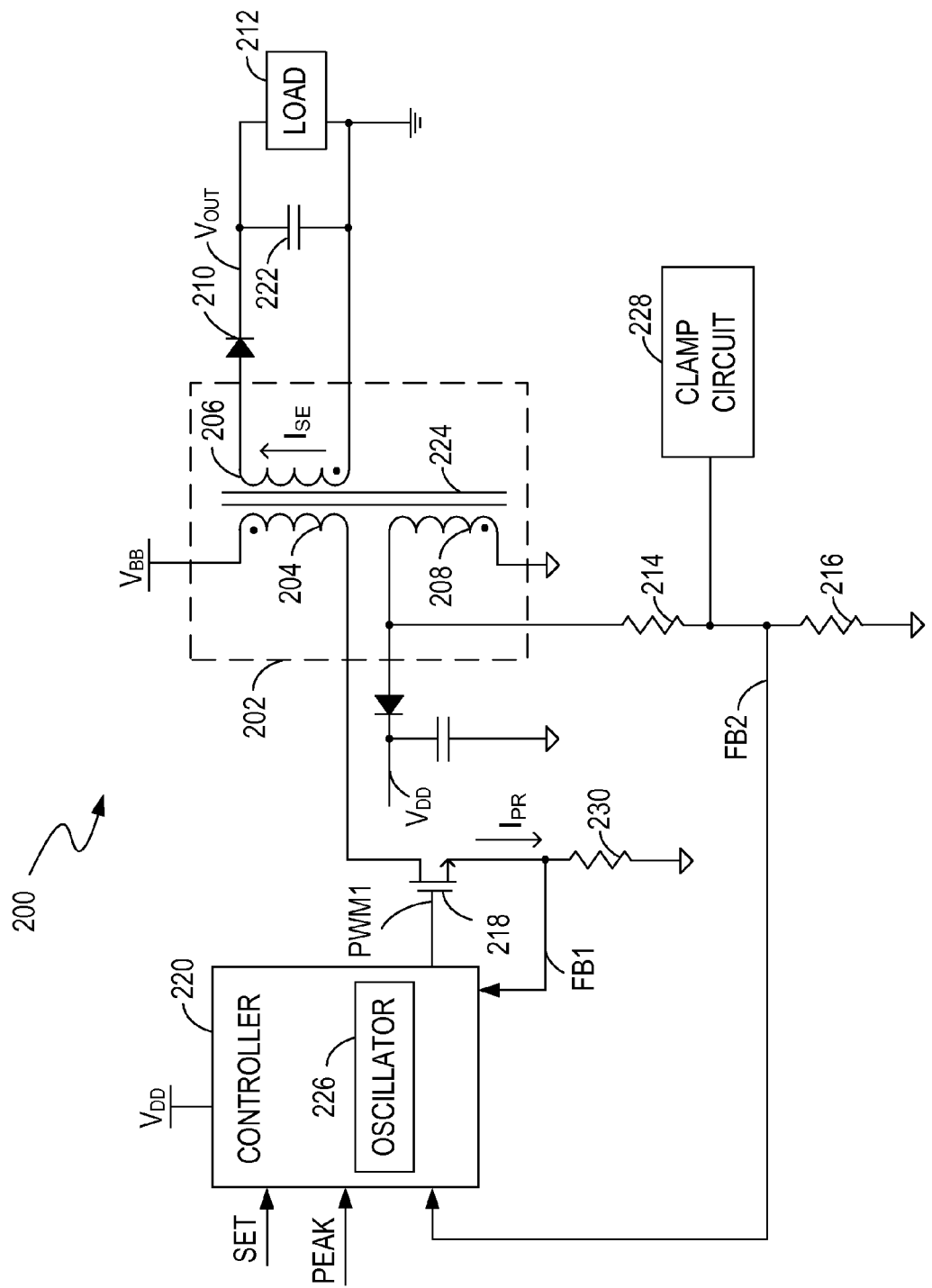
FIG. 2 shows a block diagram of a power converter, in accordance with one embodiment of the present invention.
Figure 4:
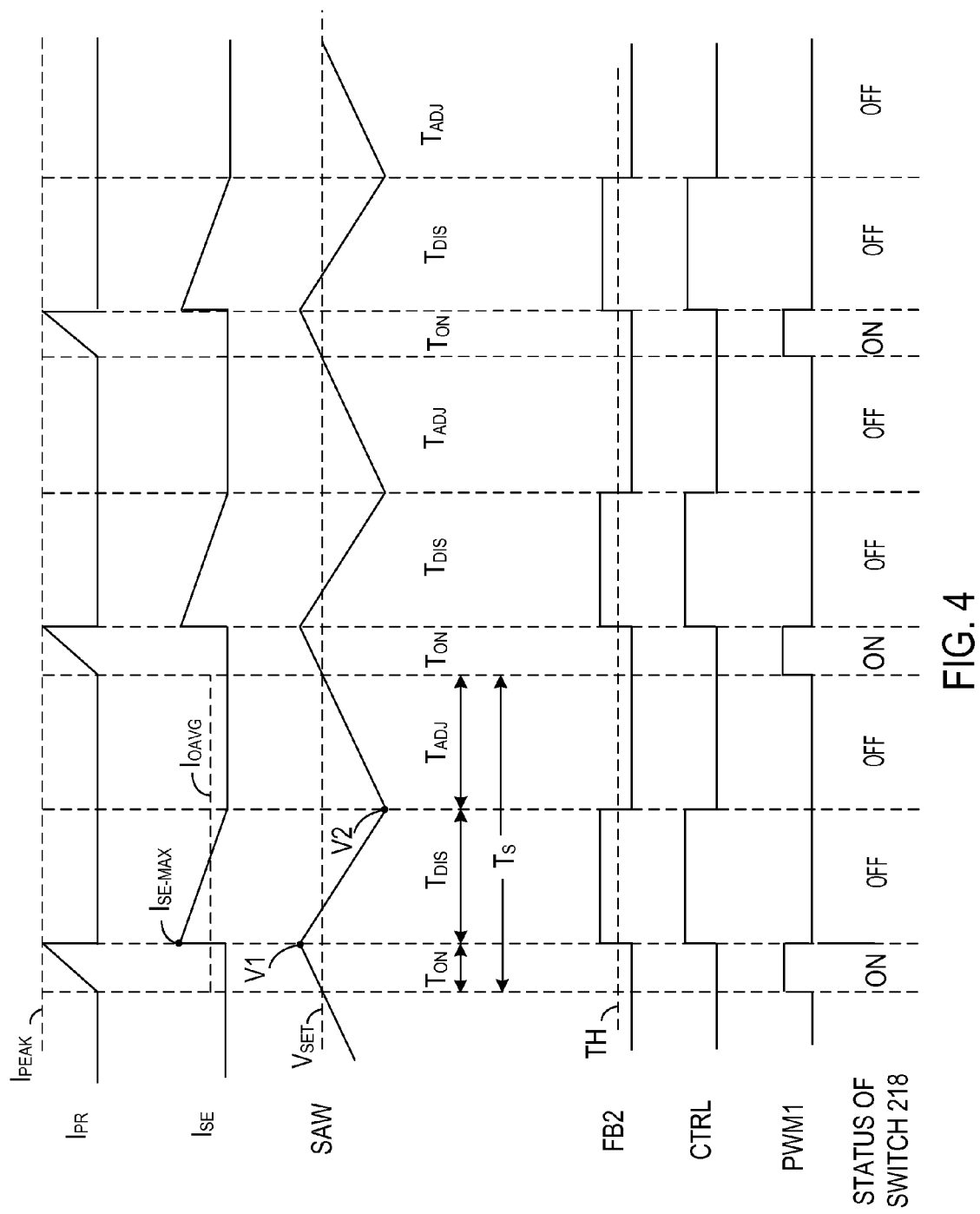
FIG. 4 shows signal waveforms of signals received or generated by a power converter, in accordance with one embodiment of the present invention.

FIG. 2 shows a block diagram of a power converter 200, in accordance with one embodiment of the present invention. FIG. 4 shows signal waveforms of signals received or generated by the power converter 200, in accordance with one embodiment of the present invention. FIG. 2 is described in combination with FIG. 4.

In the example of FIG. 2, the power converter 200 includes a controller 220 to control an operation of a transformer 202. In one embodiment, the transformer 202 includes a primary winding 204, a secondary winding 206, and an auxiliary winding 208. The primary winding 204 has one end coupled to a DC input voltage $V_{BB}$, and the other end coupled to ground through a switch 218 and a resistor 230. The secondary winding 206 is coupled to a load 212 through a diode 210. In one embodiment, the auxiliary winding 208 is at the primary side of the transformer 202. The auxiliary winding 208 has one end coupled to ground through a resistor 214 and a resistor 216, and the other end coupled to ground.

The controller 220 can control the transformer 202 by controlling the switch 218 coupled in series with the primary winding 204. In one embodiment, the controller 220 can be powered by a voltage $V_{DD}$ which is provided by the auxiliary winding 208. The resistor 230 can provide a feedback signal FB1 indicative of a current $I_{PR}$ flowing through the primary winding 204. The auxiliary winding 208 can provide a feedback signal FB2 indicative of an output voltage of the auxiliary winding 208, which can further indicate an output voltage of the secondary winding 206. As such, the feedback signal FB2 can indicate whether a current $I_{SE}$ flowing through the secondary winding 206 decreases to a predetermined current level, e.g., zero. In one embodiment, the feedback signal FB2 can be generated at a node between the resistor 214 and the resistor 216.

The power converter 200 can further include a signal generator 226 (e.g., an oscillator 226) and a clamp circuit 228. The clamp circuit 228 is operable for clamping a voltage of the feedback signal FB2 when the switch 218 is turned on. In one embodiment, the controller 220 receives a reference signal PEAK which can determine a peak current level $I_{PEAK}$ of the current $I_{PR}$ flowing through the primary winding 204, and receives a reference signal SET having a reference voltage level $V_{SET}$. In another embodiment, the reference signal PEAK and the reference signal SET are generated locally by the controller 220.

In operation, the controller 220 can receive the feedback signal FB1 and the feedback signal FB2, and generate a pulse signal, e.g., a pulse width modulation signal PWM1 based on the feedback signal FB1 and the feedback signal FB2 to control the switch 218. By controlling the switch 218 in series with the primary winding 204, the transformer 202 can operate in multiple switching cycles. In one embodiment, a switching cycle includes a charging period $T_{ON}$, a discharging period $T_{DIS}$, and an adjusting period $T_{ADJ}$, as shown in the example of FIG. 4. During the charging period $T_{ON}$, the transformer 202 is powered by the input voltage $V_{BB}$ and the current $I_{PR}$ flowing through the primary winding 204 increases. During the discharging period $T_{DIS}$, the transformer 202 discharges to power the load 212 and the current $I_{SE}$ flowing through the secondary winding 206 decreases.

More specifically, during the charging period $T_{ON}$, the controller 220 can turn on the switch 218 so that the transformer 202 is powered by the input voltage $V_{BB}$. When the switch 218 is on, the diode 210 coupled to the secondary winding 206 is reverse-biased such that there is no current flowing through the secondary winding 206. The current $I_{PR}$ flows through the primary winding 204, the switch 218, and the resistor 230 to ground. The current $I_{PR}$ can be increased linearly. Thus, during the charging period $T_{ON}$, energy can be stored in a magnetic core 224 of the transformer 202. The clamp circuit 228 is operable for clamping a voltage of the feedback signal FB2 during the charging period $T_{ON}$, and thus the voltage of the feedback signal FB2 is substantially zero.

During the discharging period $T_{DIS}$, the controller 220 turns off the switch 218 and the transformer 202 is discharged to power the load 212. When the switch 218 is off, the diode 210 coupled to the secondary winding 206 is forward-biased, and thus the energy stored in the magnetic core 224 is released through the secondary winding 206 to a capacitor 222 and the load 212. The current $I_{SE}$ flowing through the secondary winding 206 can be decreased linearly from a peak current level $I_{SE-MAX}$ to a predetermined current level, e.g., zero, during the discharging period $T_{DIS}$. The peak current level $I_{SE-MAX}$ of the secondary winding 206 is determined by the peak current level $I_{PEAK}$ of the primary winding 204 and a coil ratio of the transformer 202.

During the adjusting period $T_{ADJ}$, the switch 218 remains off. In one embodiment, there is no current flowing through the primary winding 204 or the secondary winding 206 during the adjusting period $T_{ADJ}$.

According to the waveform of the current $I_{SE}$ of the secondary winding 206 as shown in FIG. 4, the average output current $I_{OAVG}$ provided by the secondary winding 206 during a switching cycle $T_S$ can be calculated by:

$$I_{OAVG} = \frac{I_{SE-MAX}}{2} \cdot \left(\frac{T_{DIS}}{T_S}\right), \quad (1)$$

where $T_S = T_{ON} + T_{DIS} + T_{ADJ}$.

The duration of the charging period $T_{ON}$ and the duration of the discharging period $T_{DIS}$ can be determined by the inductance of the primary winding 204, the inductance of the secondary winding 206, the input voltage $V_{BB}$, and an output voltage $V_{OUT}$ across the load 212, in one embodiment. The controller 220 can determine a proper duration of the adjusting period $T_{ADJ}$ such that a ratio of the duration of the discharging period $T_{DIS}$ to the duration of the switching cycle $T_S$ is constant, wherein the duration of the switching cycle $T_S$ is the total duration of the charging period $T_{ON}$, the discharging period $T_{DIS}$ and the adjusting period $T_{ADJ}$. In equation (1), the peak current level $I_{SE-MAX}$ of the secondary winding 206 is determined by the peak current level $I_{PEAK}$ of the primary winding 204 and the coil ratio of the transformer 202. In one embodiment, since the peak current level $I_{PEAK}$ of the primary winding 204 can be a predetermined value and the transformer 202 coil ratio is constant, the peak current level $I_{SE-MAX}$ of the secondary winding 206 can be constant. Consequently, according to equation (1), if a ratio of the duration of the discharging period $T_{DIS}$ to the duration of the switching cycle $T_S$ is constant (e.g., $T_S = k \cdot T_{DIS}$, k is constant), the average output current $I_{OAVG}$ provided by the secondary winding 206 can be substantially constant.

Advantageously, even though the input voltage $V_{BB}$ and the output voltage $V_{OUT}$ may vary, the average output current $I_{OAVG}$ can still be maintained substantially constant if a ratio of the duration of the discharging period $T_{DIS}$ to the duration of the switching cycle $T_S$ is constant. In other words, by using a filter, e.g., a capacitor 222 coupled to the load 212, the power converter 200 can provide a substantially constant output current to the load 212. As used herein, "substantially constant" means that the output current may vary but within a range such that the current ripple caused by non-ideality of the circuit components can be neglected.

Figure 3:
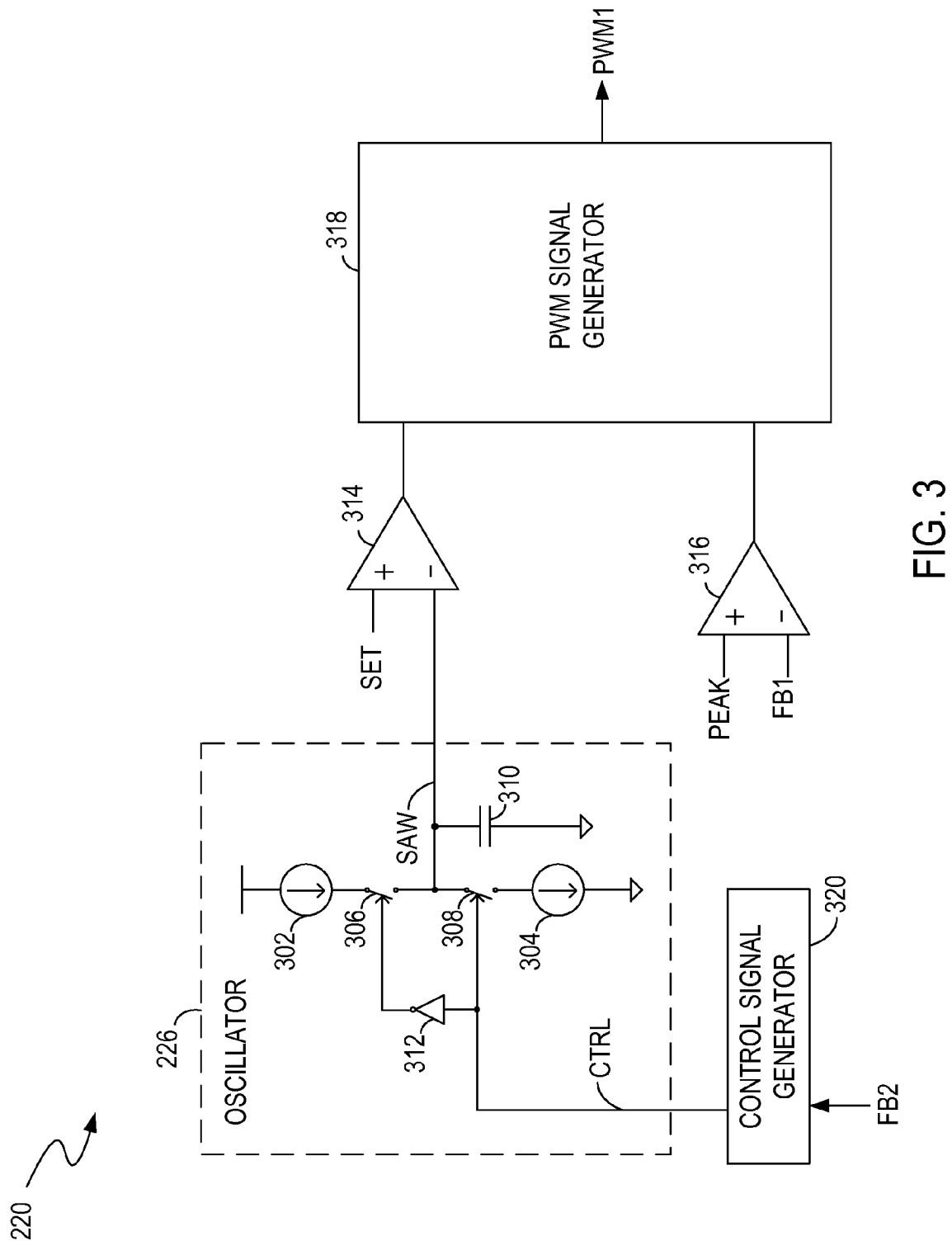
FIG. 3 shows an example of the controller in FIG. 2, in accordance with one embodiment of the present invention.

FIG. 3 shows an example of the controller 220 in FIG. 2, in accordance with one embodiment of the present invention. FIG. 3 is described in combination with FIG. 2 and FIG. 4. The controller 220 can determine a proper duration of the adjusting period $T_{ADJ}$ such that a ratio of the duration of the discharging period $T_{DIS}$ to the duration of the switching cycle $T_S$ is constant. Consequently, the power converter 200 can provide a substantially constant output current to the load 212.

In one embodiment, the controller 220 can include a signal generator 226 (e.g., an oscillator 226), a comparator 314, a comparator 316, and a pulse signal generator 318 (e.g., a PWM signal generator 318). The oscillator 226 is operable for generating a signal, e.g., a sawtooth wave signal SAW based on a feedback signal FB2. The feedback signal FB2 indicates an output voltage of the secondary winding 206. The comparator 314 is operable for comparing the sawtooth wave signal SAW with a reference signal SET. The reference signal SET has a reference voltage level $V_{SET}$. The comparator 316 is operable for comparing the feedback signal FB1 with a reference signal PEAK. The feedback signal FB1 can indicate the current $I_{PR}$ flowing through the primary winding 204. The reference signal PEAK can determine the peak current level $I_{PEAK}$ of the current $I_{PR}$ flowing through the primary winding 204. The PWM signal generator 318 coupled to the comparator 314 and the comparator 316 is operable for generating a pulse signal, e.g., a pulse width modulation signal PWM1.

The sawtooth wave signal SAW from the oscillator 226 can be configured to control a duty cycle of the pulse width modulation signal PWM1. The pulse width modulation signal PWM1 is applied to the switch 218 to control a conductance status of the switch 218 and thus to control power of the transformer 202.

The controller 220 can further include a control signal generator 320 to generate a control signal CTRL based on the feedback signal FB2. The control signal CTRL is applied to the oscillator 226. In one embodiment, if the voltage of the feedback signal FB2 is greater than a predetermined threshold TH (e.g., TH>0V), the control signal CTRL is logic 1, otherwise the control signal CTRL is logic 0. In the example of FIG. 3, the oscillator 226 includes current sources 302 and 304, switches 306 and 308, and a capacitor 310. The capacitor 310 generates an output voltage which is the sawtooth wave signal SAW. The capacitor 310 can be charged by a current from the current source 302 or be discharged by a current from the current source 304 depending on the conduction status of the switch 306 and the switch 308.

In operation, if the voltage of the capacitor 310 increases to the reference voltage level $V_{SET}$, the controller 220 can generate a pulse width modulation signal PWM1 having a first level to turn on the switch 218 (e.g., pulse width modulation signal PWM1 is logic 1). Thus, the transformer 202 can operate in the charging period $T_{ON}$. The clamp circuit 228 can force the voltage of the feedback signal FB2 to be substantially zero such that the control signal CTRL has a first level, e.g., logic 0, in one embodiment. The control signal CTRL controls the switch 308 in the oscillator 226. Moreover, the control signal CTRL is coupled to the switch 306 through a NOT gate 312. In the example of FIG. 3, when the control signal CTRL is logic 0, the switch 306 is turned on and the switch 308 is turned off. The capacitor 310 is charged by a current from the current source 302. Thus, the voltage of capacitor 310, e.g., the sawtooth wave signal SAW, can increase from the reference voltage level $V_{SET}$. Meanwhile, the current $I_{PR}$ flowing through the primary winding 204 increases. The comparator 316 compares the feedback signal FB1 with the reference signal PEAK. When the voltage of the feedback signal FB1 reaches the voltage of the reference signal PEAK, which indicates that the current $I_{PR}$ through the primary winding 204 increases to the peak current level $I_{PEAK}$, the controller 220 can turn off the switch 218 to terminate the charging period $T_{ON}$ and to initiate a discharging period $T_{DIS}$. More specifically, the PWM signal generator 318 can generate the pulse width modulation signal PWM1 having a second level (e.g., pulse width modulation signal PWM1 is logic 0) to turn off the switch 218. At the end of the charging period $T_{ON}$, the voltage of the capacitor 310, e.g., the sawtooth wave signal SAW, can increase to a first level $V_1$ as shown in FIG. 4. In other words, the switch 218 is turned on when the sawtooth wave signal SAW (the voltage across the capacitor 310) increases from the reference voltage level $V_{SET}$ until the sawtooth wave signal SAW reaches the first level $V_1$.

During the discharging period $T_{DIS}$, the switch 218 is turned off and the current $I_{SE}$ flowing through the secondary winding 206 decreases from a peak level $I_{SE-MAX}$. The auxiliary winding 208 can generate a substantially constant output voltage during the discharging period $T_{DIS}$. This output voltage is divided by the resistor 214 and the resistor 216. Therefore, during the discharging period $T_{DIS}$, the voltage of the feedback signal FB2 (e.g., the voltage across the resistor 216) is proportional to the output voltage of the auxiliary winding 208, and thus can also be substantially constant. In one embodiment, the resistance of the resistor 214 and the resistance of the resistor 216 are determined in such a way that the voltage of the feedback signal FB2 is greater than the predetermined threshold TH during the discharging period $T_{DIS}$. In the example of FIG. 3, because the feedback signal FB2 has a voltage greater than the threshold TH, the control signal CTRL is logic 1. As a result, the switch 306 is turned off and the switch 308 is turned on. The capacitor 310 is discharged by a current from the current source 304. Accordingly, the voltage of capacitor 310 can decrease from the first level $V_1$.

When the voltage of the feedback signal FB2, which indicates the output voltage of the secondary winding 206, decreases to the threshold TH, i.e., the current $I_{SE}$ flowing through the secondary winding 206 decreases to a predetermined current level, the controller 220 can terminate the discharging period $T_{DIS}$ and initiate an adjusting period $T_{ADJ}$. In one embodiment, the controller 220 terminates the discharging period $T_{DIS}$ and initiates an adjusting period $T_{ADJ}$ when the current $I_{SE}$ flowing through the secondary winding 206 decreases to substantially zero. At the end of the discharging period $T_{DIS}$, the voltage of the capacitor 310, e.g., the sawtooth wave signal SAW can decrease to a second level $V_2$ as shown in FIG. 4.

During the adjusting period $T_{ADJ}$, because the voltage of the feedback signal FB2 decreases to the threshold TH, the control signal CTRL turns to logic 0. The switch 306 is turned on and switch 308 is turned off. The capacitor 310 is charged again by the current from the current source 302. The voltage of capacitor 310 increases from the second level $V_2$. During the adjusting period $T_{ADJ}$, the switch 218 remains off and there is no current flowing through the primary winding 204 or the secondary winding 206. When the sawtooth wave signal SAW increases to the reference voltage level $V_{SET}$, the controller 220 can terminate the adjusting period $T_{ADJ}$ and turns on the switch 218 to initiate a charging period $T_{ON}$ of a next switching cycle. More specifically, the PWM signal generator 318 can generate the pulse width modulation signal PWM1 having the first level (e.g., pulse width modulation signal PWM1 is logic 1) to turn on the switch 218.

Assume that the capacitance of the capacitor 310 is $C_1$, the current of the current source 302 is $I_1$ and the current of the current source 304 is $I_2$. At the end of the charging period $T_{ON}$, the voltage of the sawtooth wave signal SAW (the voltage of the capacitor 310) can be given by:

$$V_1 = V_{SET} + \frac{T_{ON} \cdot I_1}{C_1}. \qquad (2)$$

At the end of the discharging period $T_{DIS}$, the voltage of the sawtooth wave signal SAW can be given by:

$$V_2 = V_1 - \frac{T_{DIS} \cdot I_2}{C_1}. \qquad (3)$$

At the end of the adjusting period $T_{ADJ}$, the voltage of the sawtooth wave signal SAW can be given by:

$$V_{SET} = V_2 + \frac{T_{ADJ} \cdot I_1}{C_1}. \qquad (4)$$

Thus, the duration of the adjusting period $T_{ADJ}$ can be derived from equations (2)-(4), that is:

$$T_{ADJ} = \frac{(V_{SET} - V_2) \cdot C_1}{I_1} = T_{DIS} \cdot \frac{I_2}{I_1} - T_{ON}. \quad (5)$$

According to equation (5), the relationship between the duration of the discharging period $T_{DIS}$ and the duration of the switching cycle $T_S$ can be expressed by:

$$\frac{T_{DIS}}{T_S} = \frac{T_{DIS}}{T_{ON} + T_{DIS} + T_{ADJ}} = \frac{I_1}{I_1 + I_2}. \quad (6)$$

Thus, the ratio of the duration of the discharging period $T_{DIS}$ to a total duration of the charging period $T_{ON}$, the discharging period $T_{DIS}$ and the adjusting period $T_{ADJ}$ is determined by the current $I_1$ and the current $I_2$. Advantageously, the duration of the discharging period $T_{DIS}$ can be proportional to the duration of the switching cycle $T_S$ if the current $I_1$ from the current source 302 and the current $I_2$ from the current source 304 are constant. Therefore, referring back to equation (1), the average output current $I_{OAVG}$ provided by the secondary winding 206 can be substantially constant.

Figure 5:
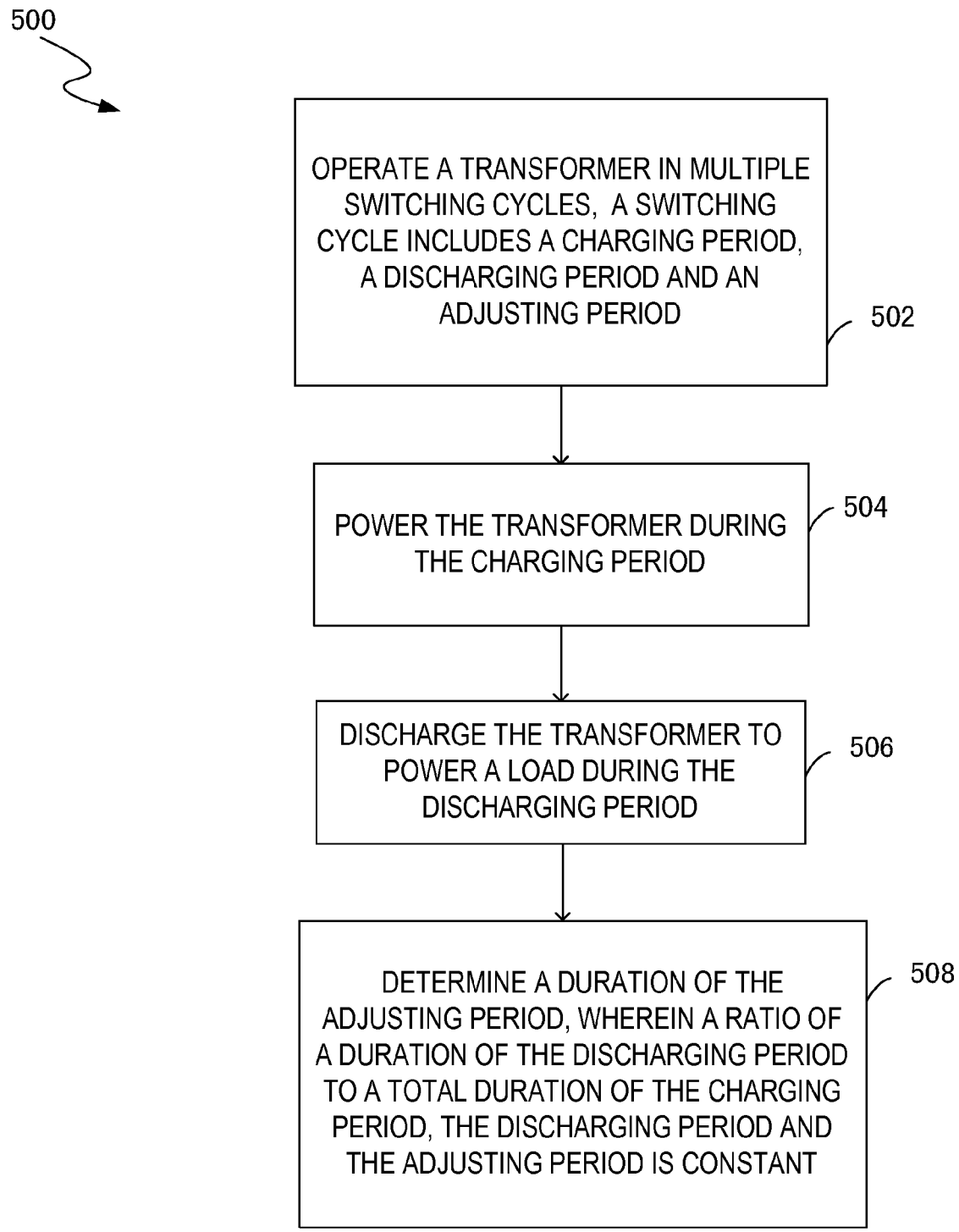
FIG. 5 shows a flowchart of a method for controlling a transformer, in accordance with one embodiment of the present invention.

FIG. 5 shows a flowchart 500 of a method for controlling a transformer, in accordance with one embodiment of the present invention. FIG. 5 is described in combination with FIG. 2, FIG. 3 and FIG. 4.

In block 502, a transformer 202 is operated in multiple switching cycles. A switching cycle can include a charging period $T_{ON}$, a discharging period $T_{DIS}$, and an adjusting period $T_{ADJ}$.

In block 504, the transformer 202 is powered by an input power during the charging period $T_{ON}$. During the charging period $T_{ON}$, a switch 218 coupled in series with a primary winding 204 of the transformer 202 is switched on. In one embodiment, the charging period $T_{ON}$ can be controlled by monitoring a current flowing through a primary winding 204 of the transformer 202. More specifically, the charging period $T_{ON}$ can be terminated (the switch 218 is turned off at the end of the charging period $T_{ON}$) and a discharging period $T_{DIS}$ can be initiated when the current flowing through the primary winding 204 increases to a predetermined peak current level.

In block 506, the transformer 202 is discharged to power a load during the discharging period $T_{DIS}$. In one embodiment, the discharging period $T_{DIS}$ can be controlled by monitoring an output voltage of an auxiliary winding 208 of the transformer 202. The output voltage of an auxiliary winding 208 can indicate whether a current flowing through the secondary winding 206 of the transformer 202 decreases to a predetermined current level. More specifically, the discharging period $T_{DIS}$ can be terminated and an adjusting period $T_{ADJ}$ can be initiated when the current flowing through the secondary winding 206 decreases to the predetermined current level, e.g., zero. In one embodiment, the current flowing through the secondary winding 206 decreases to the predetermined current level if the output voltage of the auxiliary winding 208 decreases to a predetermined voltage.

In block 508, a duration of the adjusting period $T_{ADJ}$ is determined such that a ratio of a duration of the discharging period $T_{DIS}$ to a total duration of the charging period $T_{ON}$, the discharging period $T_{DIS}$ and the adjusting period $T_{ADJ}$ is constant. In one embodiment, the duration of the adjusting period $T_{ADJ}$ can be determined by an oscillator 226. The oscillator 226 is operable for generating a sawtooth wave signal SAW. During the charging period $T_{ON}$, the sawtooth wave signal increases from a predetermined reference voltage level $V_{SET}$ to a first level $V_1$. During the discharging period $T_{DIS}$, the sawtooth wave signal decreases from the first level $V_1$ to a second level $V_2$. During the adjusting period $T_{ADJ}$ the sawtooth wave signal SAW increases from the second level $V_2$ to the reference voltage level $V_{SET}$. The adjusting period $T_{ADJ}$ can be terminated when the sawtooth wave signal SAW increases to the reference voltage level $V_{SET}$ and a new switching cycle $T_S$ can begin.

Accordingly, embodiments in accordance with the present invention provide circuits and methods for controlling power converters that can be used to power various types of loads. The power converter includes a transformer operated in multiple switching cycles. At least one switching cycle includes a charging period $T_{ON}$, a discharging period $T_{DIS}$ and an adjusting period $T_{ADJ}$. The power converter can determine a proper duration of the adjusting period $T_{ADJ}$, such that a ratio of the duration of the discharging period $T_{DIS}$ to the duration of the switching cycle $T_S$ is constant. The duration of the switching cycle $T_S$ is the total duration of the charging period $T_{ON}$, the discharging period $T_{DIS}$ and the adjusting period $T_{ADJ}$. Therefore, an average output current of each switching cycle can be substantially constant.

The power converter according to the present invention can be used in various applications. In one embodiment, the power converter can provide a substantially constant current to power a light source such as a light emitting diode (LED) string. In another embodiment, the power converter can provide a substantially constant current to charge a battery.

Advantageously, compared with the conventional flyback converter which includes an optical coupler and an error amplifier, the size of the power converter according to the present invention is relatively small.

Moreover, even if the duration of the charging period $T_{ON}$ and the duration of the discharging period $T_{DIS}$ may vary with the change of the input voltage and the output voltage of the power converter, the power converter according to the present invention can automatically adjust the duration of the adjusting period $T_{ADJ}$ to maintain a ratio of the duration of the discharging period $T_{DIS}$ to a duration of the switching cycle $T_S$ to be constant. As a result, the power converter can be self-adjusted to provide a substantially constant average output current. In addition, as can be seen in equation (1), the average output current of the power converter is not affected by the inductance of the transformer windings. Therefore, the output current of the power converter can be controlled more accurately.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power converter, comprising:
a transformer having a primary winding coupled to a power source and a secondary winding coupled to a load; and a signal generator operable for generating a sawtooth wave signal, wherein said transformer is configured to operate in a plurality of switching cycles, and at least one of said switching cycles comprises a charging period, a discharging period, and an adjusting period, wherein during said charging period said sawtooth wave signal increases from a predetermined reference voltage level to a first level, wherein during said discharging period said sawtooth wave signal decreases from said first level to a second level that is lower than said predetermined voltage level, wherein during said adjusting period said sawtooth wave signal increases from said second level to said predetermined reference voltage level, wherein during said charging period said transformer is powered by said power source and a current flowing through said primary winding increases, wherein during said discharging period said transformer discharges to power said load and a current flowing through said secondary winding decreases, and wherein a ratio of a duration of said discharging period to a total duration of said charging period, said discharging period and said adjusting period is constant.

2. The power converter of claim 1, further comprising:
a resistor coupled in series with said primary winding and operable for providing a feedback signal indicative of said current flowing through said primary winding.

3. The power converter of claim 1, wherein said transformer further comprises an auxiliary winding operable for providing a feedback signal indicating whether said current flowing through said secondary winding decreases to a predetermined current level.

4. The power converter of claim 3, further comprising a clamp circuit operable for clamping a voltage of said feedback signal during said charging period.

5. The power converter of claim 1, further comprising:
a switch coupled in series with said primary winding, wherein said switch is turned on when said sawtooth wave signal increases from said predetermined reference voltage level until said sawtooth wave signal reaches said first level, and wherein said switch is turned off if said current flowing though said primary winding increases to a predetermined peak current level.

6. The power converter of claim 1, further comprising:
a switch coupled in series with said primary winding, wherein said switch is on during said charging period and is off during said discharging period and said adjusting period.

7. The power converter of claim 1, further comprising:
a switch coupled in series with said primary winding, wherein said sawtooth wave signal is configured to control a duty cycle of a pulse signal that controls said switch.

8. The power converter of claim 1, wherein said signal generator comprises:
a capacitor coupled to said transformer for providing said sawthooth wave signal,
wherein during said charging period said capacitor is charged by a first current, and a voltage across said capacitor increases from said predetermined reference voltage level to said first level,
wherein during said discharging period said capacitor is discharged by said second current, and said voltage across said capacitor decreases from said first level to said second level, wherein during said adjusting period said voltage across said capacitor increases from said second level to said predetermined reference voltage level.

9. The power converter of claim 8, wherein said ratio is determined by said first current and said second current.

10. The power converter of claim 1, wherein an average level of said current flowing through said secondary winding is substantially constant.

11. A controller for controlling a transformer, said controller comprising:
a first signal generator operable for receiving a first feedback signal indicating an output voltage of a secondary winding of said transformer and for generating a first signal; and
a pulse signal generator coupled to said first signal generator and operable for generating a pulse signal based on said first signal, wherein said pulse signal is configured to control power of said transformer,
wherein said first signal increases from a predetermined reference voltage level to a first level during a charging period, wherein said first signal decreases from said first level to a second level that is lower than said predetermined reference voltage level during a discharging period, and wherein said first signal increases from said second level to said predetermined reference voltage level during an adjusting period,
wherein a ratio of a duration of said discharging period to a total duration of said charging period, said discharging period and said adjusting period is constant,
wherein during said charging period a current flowing through a primary winding of said transformer increase, wherein during said discharging period a current flowing through said secondary winding decreases.

12. The controller of claim 11, wherein said pulse signal is configured to control a switch coupled in series with a primary winding of said transformer, original wherein said switch is on during said charging period and is off during said discharging period and said adjusting period.

13. The controller of claim 11, wherein said controller is operable for terminating said charging period and initiating said discharging period when said current flowing through said primary winding of said transformer increases to a predetermined peak current level, and is operable for terminating said discharging period and initiating said adjusting period when said current flowing through said secondary winding decreases to a predetermined current level.

14. The controller of claim 11, wherein said first signal generator comprises a capacitor coupled to said pulse signal generator, wherein during said charging period said capacitor is charged by a first current and a voltage across said capacitor increases from said predetermined reference voltage level to said first level, wherein during said discharging period said capacitor is discharged by a second current, and said voltage across said capacitor decreases from said first level to said second level, wherein during said adjusting period said voltage across said capacitor increases from said second level to said predetermined reference voltage level.

15. The controller of claim 14, wherein said ratio is determined by said first current and said second current.

16. The controller of claim 11, further comprising:
a comparator coupled to said pulse signal generator and operable for comparing a second feedback signal indicative of a current flowing through a primary winding of said transformer with a predetermined peak current level.

17. A method for controlling a transformer, comprising:

operating said transformer in a plurality of switching cycles, wherein at least one of said switching cycles comprises a charging period, a discharging period, and an adjusting period;

powering said transformer during said charging period;

discharging said transformer to power a load during said discharging period; and determining a duration of said adjusting period, comprising:

generating a sawtooth wave signal;

increasing said sawtooth wave signal from a predetermined reference voltage level to a first level during said charging period;

decreasing said sawtooth wave signal from said first level to a second level that is lower than said predetermined reference voltage level during said discharging period;

increasing said sawtooth wave signal from said second level during said adjusting period; and terminating said adjusting period when said sawtooth wave signal increases to said predetermined reference voltage level, wherein a ratio of a duration of said discharging period to a total duration of said charging period, said discharging period and said adjusting period is constant.

18. The method of claim 17, further comprising:

turning on a switch coupled in series with a primary winding of said transformer during said charging period;

terminating said charging period and initiating said discharging period when a current flowing through said primary winding increases to a predetermined peak current level;

turning off said switch at the end of said charging period;

terminating said discharging period and initiating said adjusting period when a current flowing through a secondary winding of said transformer decreases to a predetermined current level; and turning on said switch at the end of said adjusting period.

19. The method of claim 18, further comprising:

monitoring an output voltage of an auxiliary winding of said transformer, wherein said output voltage of said auxiliary winding indicates whether said current flowing through said secondary winding decreases to said predetermined current level.

\* \* \* \* \*